Dec. 16, 1930.    J. L. HASEMANN    1,785,345
CASING FOR FLEXIBLE SHAFTS
Filed May 19, 1928
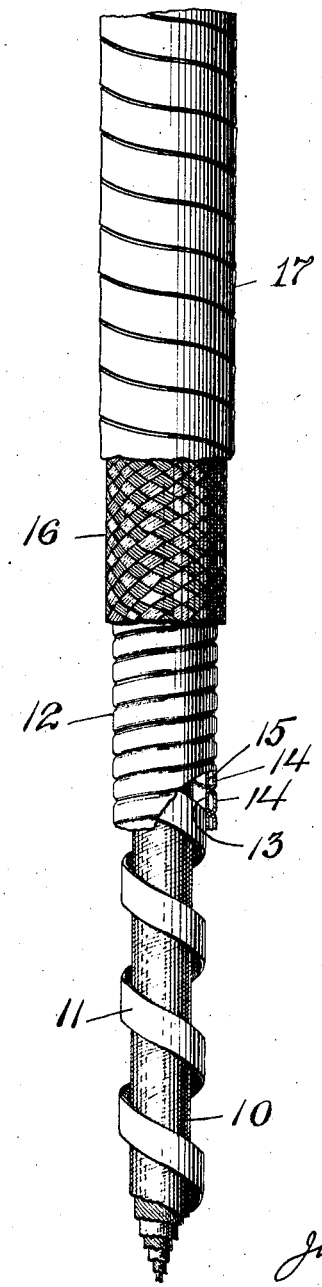
INVENTOR
John L. Hasemann
BY
Wm H Caufield
ATTORNEY Patented Dec. 16, 1930

1,785,345

UNITED STATES PATENT OFFICE

JOHN L. HASEMANN, OF CALDWELL, NEW JERSEY, ASSIGNOR TO AMERICAN FLEXIBLE SHAFT MANUFACTURING CORPORATION, OF NEWARK, NEW JERSEY

CASING FOR FLEXIBLE SHAFTS

Application filed May 19, 1928. Serial No. 278,980.

This invention relates to a casing for a flexible shaft, the casing having the primary property of providing a cover for the shaft and in addition, providing a casing that resists wear from the shaft and from outside contacts, that resists elongation and is therefore in proper relation to the shaft and one that resists the entry of water to the shaft and that also will contain oil or grease under pressure.

The casing with the above advantages is also of sufficient flexibility to conform to the curvature of flexible shafts under usual commercial use.

The invention is illustrated in the accompanying drawing in which the single figure shows a casing broken away to illustrate the various layers or elements which go to make up the complete article and in the drawing I show the flexible shaft 10 which can be of any desired construction as the shaft itself forms no part of my invention.

The casing has an inner element forming a bearing for the shaft and the form shown employes the strip 11 formed into a spiral and being made of wear-resisting hard metal.

Around the bearing strip 11 is a sleeve 12 which is protected by the bearing strip 11 as it is made of metal bent to form liquid-tight joints. This sleeve is usually formed of a metal strip of a general ogee shape with one end 13 overlapping the other end 14 when wound as a helix and enclosing the packing 15 which serves to make the sleeve tight enough to confine grease under pressure. This is necessary as in many instances with modern lubricating methods a high pressure is sometimes applied in injecting the grease into the casing. The sleeve also serves to keep out water which is necessary in many cases, as where the casing is employed in the speedometer connection of an automobile. The sleeve is usually made of a comparatively soft metal to enable it to be pressed in to form tight joints and this soft material is saved from wear by the bearing 11.

The spiral formation of the bearing element 11 and the sleeve 12 makes them susceptible to easy elongation under strain and in order to prevent this and save the joints of the sleeve from becoming leaky I provide a cover 16 which is braided or woven from small wires and is not subject to elongation. The wires are fine enough to allow flexibility but are closely wound or braided on the sleeve 12 and give to any length of casing a fixed and determined length.

The wires are individually of small gage and if subjected to wear soon show little projecting ends which cut the hand when the device is handled and to protect this cover I place a protecting armor 17 thereon, usually in the form of a hard metal strip wound around the cover and not only protecting the cover but guarding the whole casing against cross-sectional distortion under blows or pressure.

The whole device is therefore a complete liquid-proof non-stretchable casing with an outside armor and an inside bearing.

I claim:

1. A casing for flexible shafts comprising a spiral bearing strip, a liquid-proof sleeve surrounding said spiral strip, a woven cover on the sleeve and a closely wound protecting strip on the outside of the cover, all said elements being of limited flexibility.

2. A casing for flexible shafts comprising a spiral bearing strip of hard metal, a flexible liquid-proof sleeve around said bearing strip and adapted to confine oil, a cover of fine woven wire to prevent elongation of the casing and a spiral strip of hard metal on the outside of the cover to act as an armor.

In testimony whereof I affix my signature.

JOHN L. HASEMANN.